(12) United States Patent
Ide et al.

(10) Patent No.: US 11,355,795 B2
(45) Date of Patent: Jun. 7, 2022

(54) BATTERY MANUFACTURING APPARATUS AND BATTERY MANUFACTURING METHOD

(71) Applicant: TOYOTA JIDOSHA KABUSHIKI KAISHA, Toyota (JP)

(72) Inventors: Naotaka Ide, Nagakute (JP); Kiwamu Kobayashi, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 320 days.

(21) Appl. No.: 16/504,507

(22) Filed: Jul. 8, 2019

(65) Prior Publication Data

US 2020/0106142 A1    Apr. 2, 2020

(30) Foreign Application Priority Data

Sep. 27, 2018 (JP) .............................. JP2018-182396

(51) Int. Cl.

| | |
|---|---|
| *H01M 10/613* | (2014.01) |
| *H01M 10/04* | (2006.01) |
| *H01M 50/204* | (2021.01) |
| *H01M 50/20* | (2021.01) |

(52) U.S. Cl.
CPC ..... *H01M 10/613* (2015.04); *H01M 10/0404* (2013.01); *H01M 10/0413* (2013.01); *H01M 50/20* (2021.01); *H01M 50/204* (2021.01)

(58) Field of Classification Search
CPC ........... H01M 10/0413; H01M 10/613; H01M 10/6563; H01M 10/6566; H01M 50/20; H01M 50/204; H01M 50/209; H01M 10/0404

See application file for complete search history.

(56) References Cited

U.S. PATENT DOCUMENTS

2013/0224537 A1*  8/2013  Choi ................. H01M 10/6557
                                                  429/71
2014/0356659 A1   12/2014  Kado

FOREIGN PATENT DOCUMENTS

| JP | 2013-118048 A | 6/2013 |
| JP | 2014-232665 A | 12/2014 |
| JP | 2017-063005 A | 3/2017 |
| JP | 2017-097986 A | 6/2017 |
| WO | WO-2016129385 A1 * | 8/2016 ........ H01M 10/6566 |

* cited by examiner

*Primary Examiner* — Jonathan G Jelsma
(74) *Attorney, Agent, or Firm* — Oliff PLC

(57) ABSTRACT

A battery manufacturing apparatus includes a binding member for bounding a battery stack and a fluid supplying part for blowing cooling fluid onto the bound battery stack. The binding member includes a first both-side part for bounding batteries from both sides by applying a load thereon in a first direction in which the batteries are arranged, and a second both-side part to be placed on both sides of the batteries to face both side surfaces of the batteries in a second direction different from the first direction. The binding member is formed with apertures through which the cooling fluid flows outward in the second direction. The fluid supplying part includes a first discharging part and a second discharging part for discharging the cooling fluid from both sides in a third direction different from both the first direction and the second direction toward the battery stack bound by the binding member.

4 Claims, 8 Drawing Sheets

BATTERY MANUFACTURING APPARATUS AND BATTERY MANUFACTURING METHOD

CROSS-REFERENCE TO RELATED APPLICATIONS

This application is based upon and claims the benefit of priority from the prior Japanese Patent Application No. 2018-182396 filed on Sep. 27, 2018, the entire contents of which are incorporated herein by reference.

BACKGROUND

Technical Field

This disclosure relates to an apparatus and a method for manufacturing batteries and more particularly to a battery manufacturing apparatus configured to perform a cooling step of cooling a battery having an outer configuration which has been completely assembled and a battery manufacturing method including the distinguishing cooling step.

Related Art

Heretofore, a cooling step has been performed in the process of manufacturing batteries. One reason why the cooling step is performed is a high-temperature aging that keeps an assembled battery at a high temperature. This battery has to be cooled after completion of the high-temperature aging. As a conventional art including such a cooling step, there is a technique disclosed in Japanese patent unexamined application publication No. 2013-118048 (JP 2013-118048A). This publication JP 2013-118048A is directed to a flat battery. Specifically, a plurality of batteries is bound by a binding member and then these bound batteries are subjected to the cooling step. Spacers 75 (FIG. 4 of JP 2013-118048A) are each interposed between each adjacent two of the batteries bound by the binding member. Each of the spacers 75 is formed with grooves 76 each extending in a vertical direction. These grooves 76 function as ventilation paths (paragraph 0041 of JP 2013-118048A).

SUMMARY

Technical Problems

However, the foregoing conventional art may cause the following problems. The cooling efficiency in the cooling step is low, leading to a long cooling time. This is because the ventilation paths defined by the grooves 76 each have a low ratio of a surface area relative to a contact surface area of each spacer 75 contacting with a corresponding battery. However, each spacer 75 in JP 2013-118048A is also a member for applying a bounding force to the batteries in a bound state (paragraph 0037 of JP 2013-118048A). Therefore, it is difficult to reduce the contact area with the batteries and thus the ventilation paths hardly can be designed with a wider area. This is because if the ventilation paths are forcibly designed with a wider area, the contact surface area of the spacers 75 with the batteries is not sufficient, which is undesirable.

This disclosure has been made to address the above problems and has a purpose to provide a battery manufacturing apparatus and a battery manufacturing method capable of cooling a plurality of batteries in a bound state with high efficiency.

Means of Solving the Problems

To achieve the above-mentioned purpose, one aspect of the present disclosure provides a battery manufacturing apparatus comprising: a binding member configured to bind a battery stack including a plurality of flat batteries arranged in one direction; and a fluid supplying part configured to blow cooling fluid on the battery stack bound by the binding member, the binding member comprising: first both-side parts configured to bind the battery stack by applying a load on the battery stack from both sides of the batteries in a first direction in which the batteries are arranged; and second both-side parts to be placed at both sides of the batteries included in the battery stack in a second direction different from the first direction to face, at a distance from, both side surfaces of the batteries in the second direction, the second both-side parts each including an aperture to allow the cooling fluid supplied from the fluid supplying part to flow outward in the second direction, and the fluid supplying part including a first discharging part and a second discharging part each configured to discharge the cooling fluid from both sides of the battery stack in a third direction different from both the first and the second directions toward the battery stack bound by the binding member.

The battery manufacturing apparatus in the foregoing aspect is configured to perform the cooling step of the process of manufacturing batteries. The apparatus in the above aspect is configured to perform the cooling step for flat batteries each having an outer configuration completely assembled. During the cooling step using the apparatus configured as above, the plurality of batteries to be subjected to the cooling step are bounded in the form of a battery stack. The batteries in the battery stack are arranged in a row in the first direction and restrained under load applied from both sides in the first direction by the first both-side parts. In this state, furthermore, the second both-side parts are placed at both sides of the battery stack in the second direction to face, at a distance from, both side surfaces of the batteries in the second direction.

In this state, the cooling fluid is discharged or ejected from the fluid supplying part through the first discharging part and the second discharging part toward the battery stack. The cooling fluid from the first discharging part and the second discharging part is blown on the battery stack from both sides in the third direction. The streams of cooling fluid blown from each side in the third direction will enter the clearances between both side surfaces of each battery and the corresponding second both-side parts and collide and merge together thereat. Then, the merged fluid streams flow outward in the second direction through the apertures of the second both-side parts. At that time, the batteries are cooled by contact with the cooling fluid. On both side surfaces of each battery in the second direction, there is no particular obstacle. Thus, those surfaces are preferably utilized for cooling each battery. Further, for cooling each battery, it is beneficial to generate turbulent streams of the cooling fluid that are ejected from the first and second discharging parts and cause the turbulent streams to collide with each other on the both side surfaces of each battery in the second direction.

In the battery manufacturing apparatus configured as above, the aperture may be formed at a center of the second both-side part in the third direction. This configuration will cause collision of the streams of cooling fluid on both side surfaces of each battery in the second direction to occur at substantially the center of the dimension of each battery in the third direction. This generates an advantageous factor in cooling each battery. Herein, the "center part" has only to satisfy that the center of the aperture in the third direction is located in a range being centered on the center of the second both-side part or each battery in the third direction and extending vertically by one-quarter of the dimension of the second both-surface part or each battery in the third direction.

Another aspect of the present disclosure provides a battery manufacturing method comprising the steps of: (a) assembling a plurality of flat batteries; and (b) binding a battery stack including the plurality of assembled batteries arranged in one direction by a binding member and blowing cooling fluid on the battery stack through a fluid supplying part to cool the battery stack, wherein the method uses the binding member comprising: first both-side parts configured to bind the battery stack by applying a load on the battery stack from both sides of the batteries in a first direction in which the batteries are arranged; and second both-side parts to be placed at both sides of the batteries included in the battery stack in a second direction different from the first direction to face, at a distance from, both side surfaces of the batteries in the second direction, the second both-side parts each including an aperture to allow the cooling fluid supplied from the fluid supplying part to flow outward in the second direction, and the method uses the fluid supplying part including a first discharging part and a second discharging part each configured to discharge the cooling fluid from both sides of the battery stack in a third direction different from both the first and the second directions toward the battery stack bound by the binding member, and the step (b) includes causing the cooling fluid discharged from the fluid supplying part through the first discharging part and the cooling fluid discharged from the fluid supplying part through the second discharging part to collide and merge together, and then flow outward in the second direction through the apertures.

In the foregoing battery manufacturing method, the step (b) of cooling the batteries after the assembling step (a) in the manufacturing process of batteries is performed using the battery manufacturing apparatus configured as above.

According to the configuration described above, a battery manufacturing apparatus and a battery manufacturing method can be provided capable of high-efficiently cooling a plurality of batteries in a bound state.

DETAILED DESCRIPTION OF THE EXEMPLARY EMBODIMENTS

Figure 1:
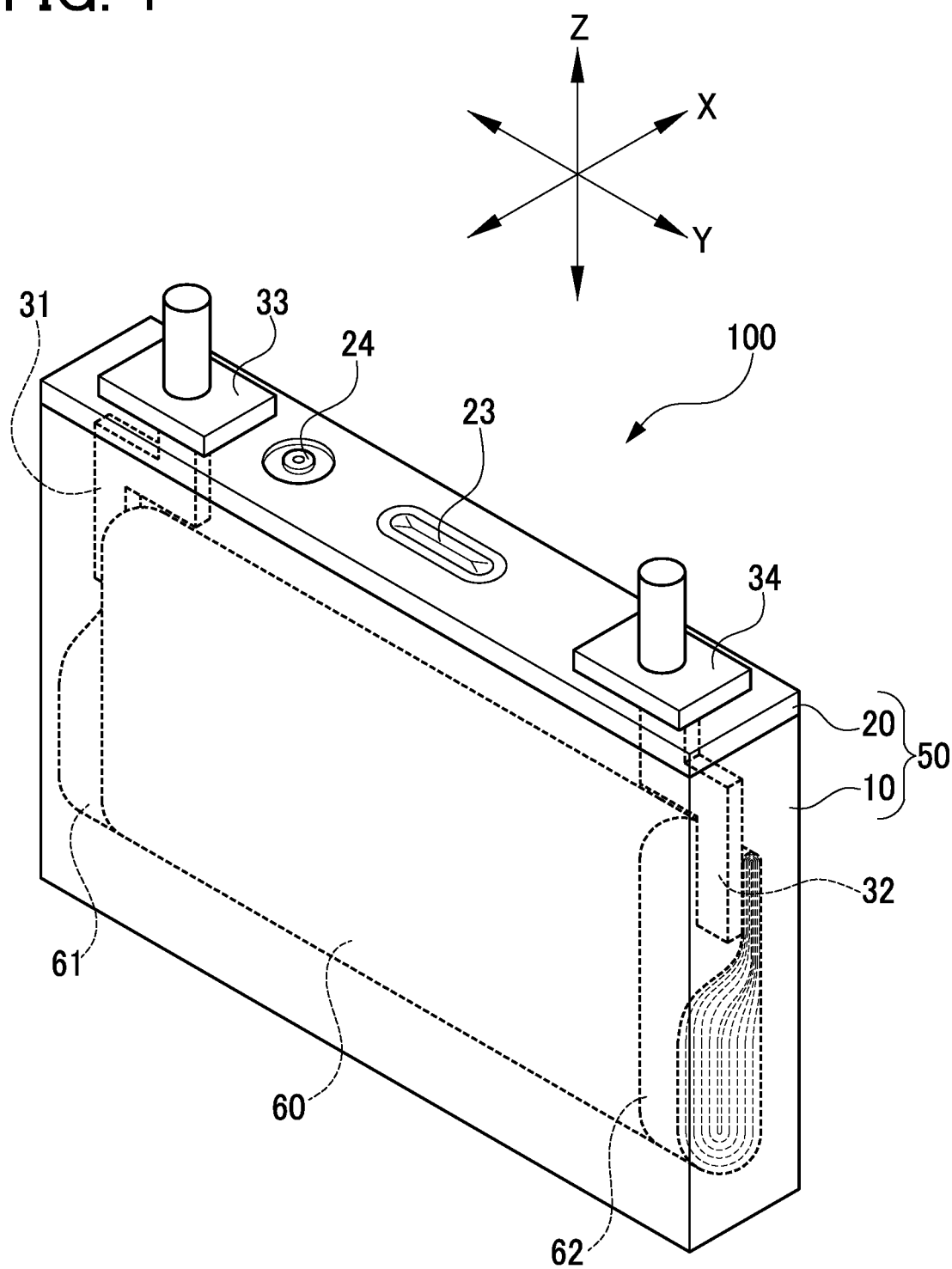
FIG. 1 is a perspective transparent view showing an outer appearance and an inner configuration of a battery to be manufactured in an embodiment.

A detailed description of an embodiment of this disclosure will now be given referring to the accompanying drawings. In the present embodiment, the disclosure is applied to an apparatus and a method for manufacturing a battery(s) 100 shown in FIG. 1. The battery 100 in FIG. 1 is a sealed rectangular battery including a power generating element 60 and a rectangular outer package body 50 configured as an outer shell for housing the power generating element 60. FIG. 1 is a transparent view of the outer package body 50. In the following description, for convenience of explanation, the directions in the drawings are defined as follows: the depth direction of the outer package body 50 (i.e., an X-direction in FIG. 1) is a first direction, the width direction of the outer package body 50 (i.e., a Y-direction in FIG. 1) is a second direction, and the height direction of the outer package body 50 (i.e., a Z-direction in FIG. 1) is a third direction.

The outer package body 50 consists of a battery case 10 and a sealing lid 20 that seals an open end of the battery case 10. The battery case 10 and the sealing lid 20 are made of metal material, such as aluminum, aluminum alloy, carbon steel, and stainless steel. As the metal material for the battery case 10 and the sealing lid 20, any metal material may be selected as long as it can be easily shaped and it has rigidity. The battery case 10 has a rectangular parallelepiped shape with an open upper end and a closed bottom end. The battery case 10 houses therein the power generating element 60 and hermetically closed by the sealing lid 20 placed over the open end.

To the sealing lid 20, there are attached a positive current collector terminal 31 and a negative current collector terminal 32 each penetrating through the sealing lid 20 to protrude outward. The positive current collector terminal 31 and the negative current collector terminal 32 are respectively insulated from the sealing lid 20 by an insulating member 33 and an insulating member 34. The sealing lid 20 is further provided with a safety valve 23 and a liquid inlet 24. The power generating element 60 is a laminated assembly made of a strip-shaped positive electrode sheet 61 and a strip-shaped negative electrode sheet 62 laminated with separators each interposed therebetween. The power generating element 60 in FIG. 1 is a battery having a flat wound structure, but may be a battery having a flat laminated structure. The positive electrode sheet 61 is joined with the positive current collector terminal 31 and the negative electrode sheet 62 is joined with the negative current collector terminal 32. The outer package body 50 further contains therein an electrolytic solution.

Next, the method for manufacturing the foregoing battery (s) 100 will be described referring to a flowchart in FIG. 2. Each battery 100 is firstly assembled as a single body (S01). Specifically, the power generating element 60 is inserted in the battery case 10, and then the sealing lid 20 is welded to the open end of the battery case 10 to seal the power generating element 60 in the outer package body 50. Thereafter, the electrolyte solution is poured into the outer package body 50 through the liquid inlet 24. The outer configuration of each battery 100 is thus completely assembled. Those batteries 100 then undergo initial charging (S02).

Figure 3:
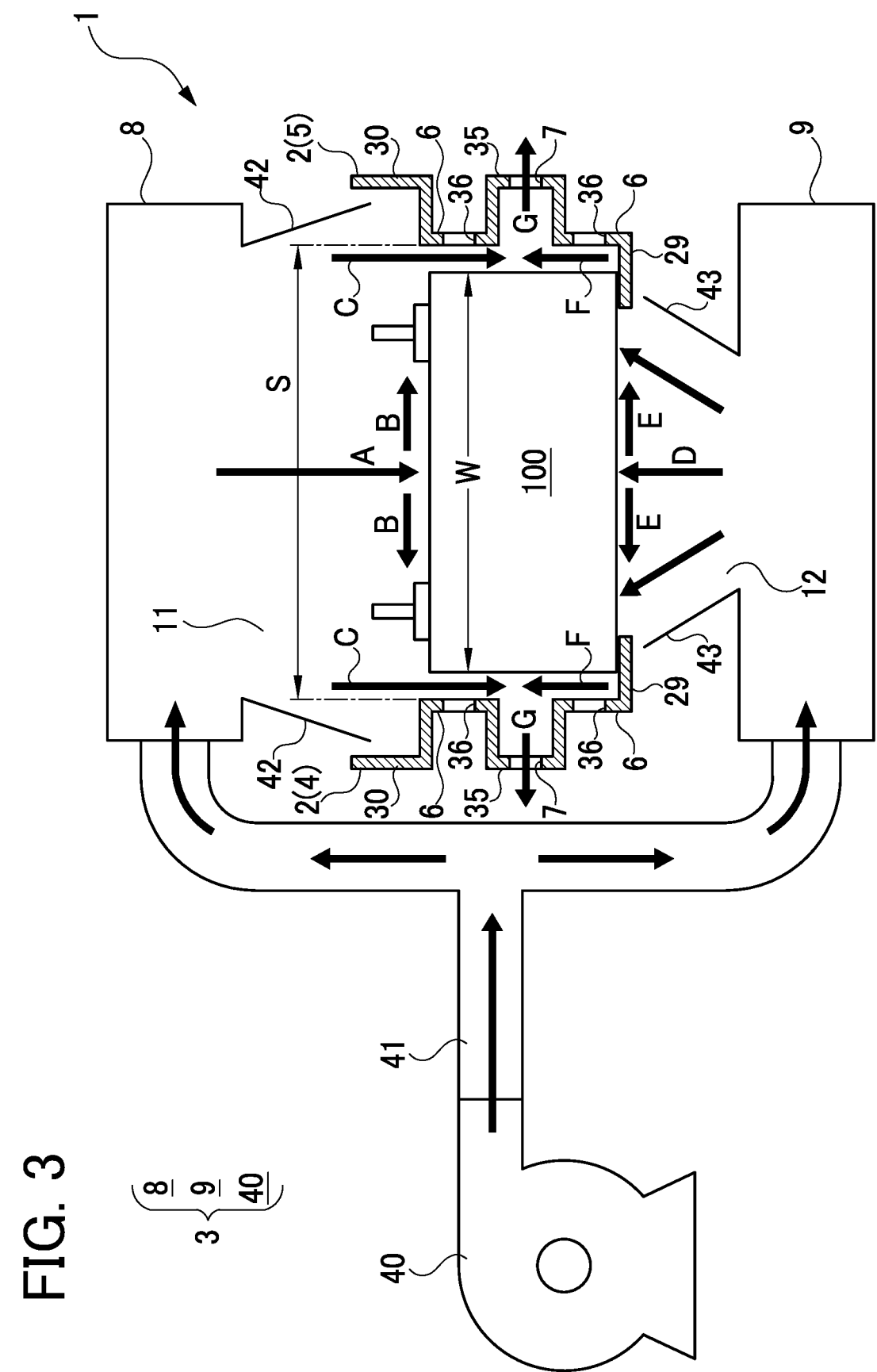
FIG. 3 is a cross-sectional diagram showing the structure of a battery manufacturing apparatus in the embodiment including a battery.

The batteries 100 after the initial charging are bound together by a binding member (S03). This enables the batteries 100 in a bound state to be subjected to high-temperature aging in S04 and cooling in S05. This step of binding the batteries 100 is performed by using a battery manufacturing apparatus 1 shown in FIG. 3. FIG. 3 illustrates the configuration of the battery manufacturing apparatus 1 including the batteries 100 to be bound. The battery manufacturing apparatus 1 shown in FIG. 3 includes a binding member 2 and a blower mechanism 3. In the battery manufacturing apparatus 1, actually, the binding member 2 binds the batteries 100. It is to be noted that the battery 100 in FIG. 3 is illustrated with its internal structure omitted.

Figure 4:
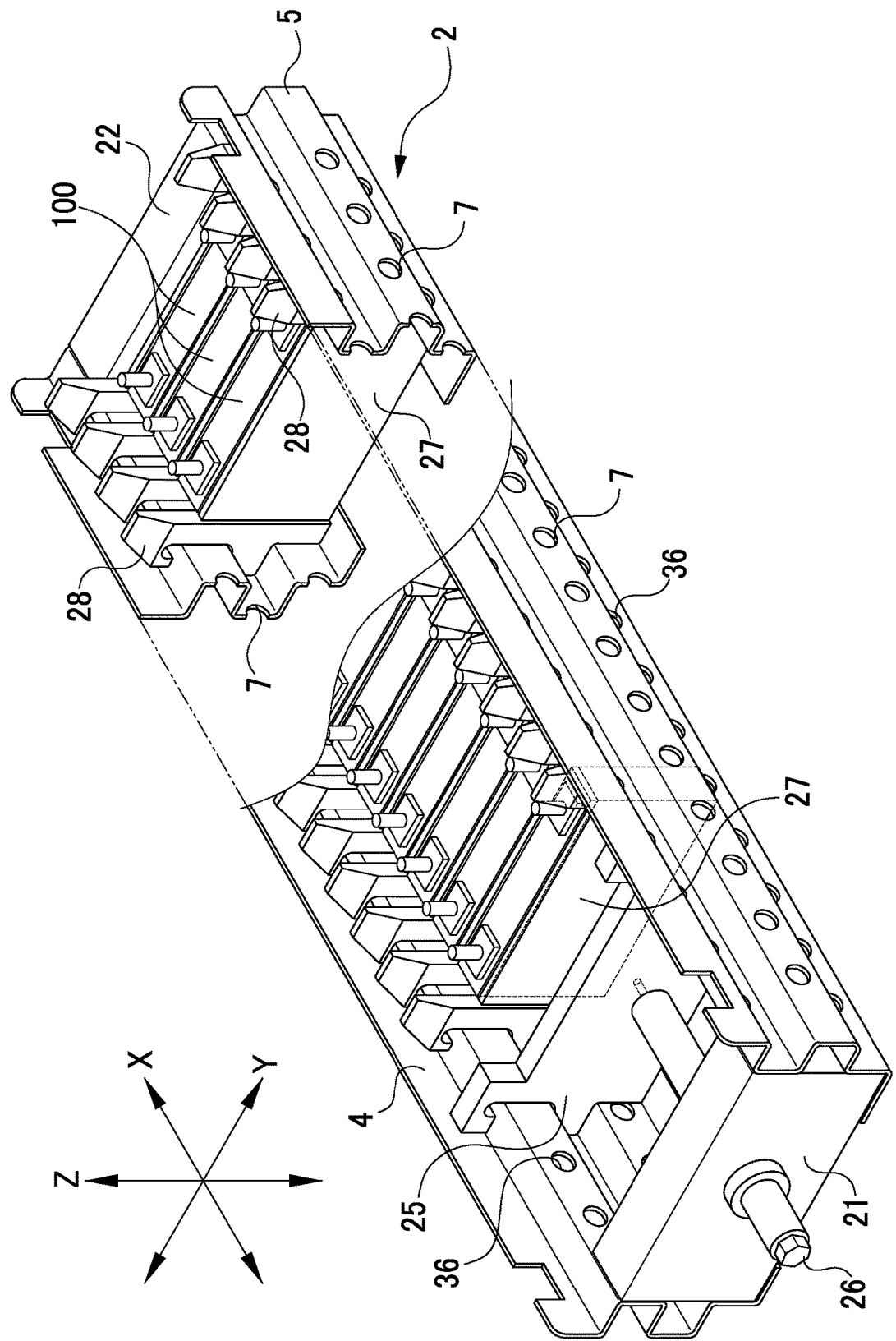
FIG. 4 is a perspective view showing a state where batteries are mounted in a binding member, which is a part of the battery manufacturing apparatus in the embodiment.
Figure 5:
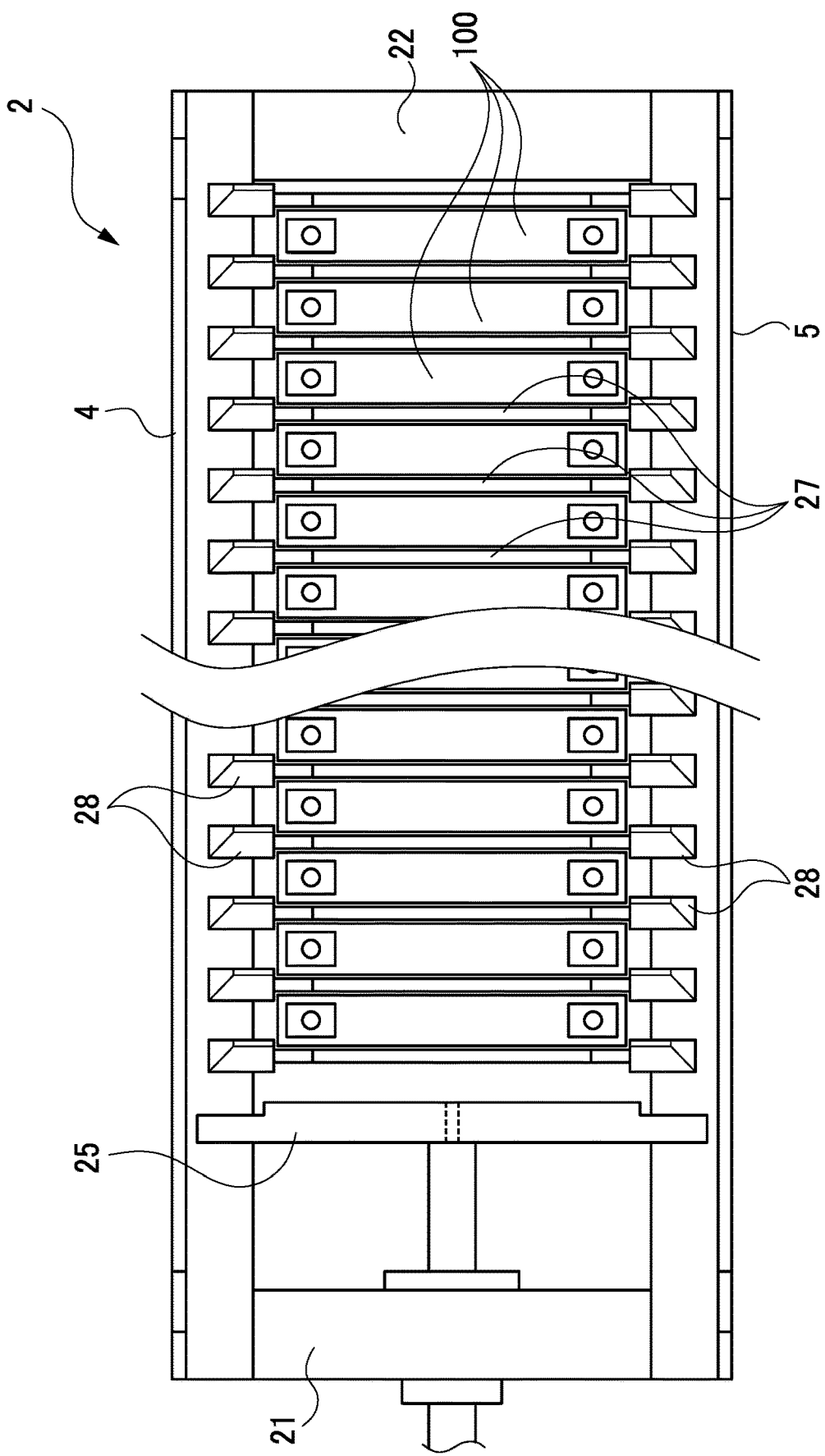
FIG. 5 is a plan view of the configuration shown in FIG. 4.

FIGS. 4 and 5 show only some of components illustrated in FIG. 3, i.e., the binding member 2 and the batteries 100 bound therein. As shown in FIGS. 4 and 5, actually, the binding member 2 mounts a plurality of batteries 100. The plurality of batteries 100 mounted in the binding member 2 are arranged in a row in one direction. The plurality of batteries 100 mounted in the binding member 2 are herein referred to as a battery stack. The details of the battery manufacturing apparatus 1 will be described later.

Returning to FIG. 2, the bound batteries 100 (i.e., the battery stack) are subjected to the high-temperature aging step (S04) to stabilize battery performance. The conditions for the high-temperature aging are for example on the order of 60° C. to 80° C. and 10 to 200 hours. The batteries 100 (i.e., the battery stack) having undergone the high-temperature aging are then subjected to the cooling step (S05). This is to quickly return the batteries 100 from the temperature in the high-temperature aging step to a normal temperature. The details of the cooling step will be described later. The batteries 100 after the cooling step are subjected to checking (S06). To be concrete, battery voltage or discharge current is measured and, based on this measurement result, it is determined whether each battery 100 is a good product or a defective product. A battery determined as a defective product is eliminated from a group of products. The batteries 100 are manufactured in the above-described manner.

In the foregoing manufacturing process for the batteries 100, the high-temperature aging step in S04 and the cooling step in S05 are performed with respect to the batteries 100 mounted as a battery stack in the battery manufacturing apparatus 1. Thus, the details of the battery manufacturing apparatus 1 will be further described below. The binding member 2 of the battery manufacturing apparatus 1 is first explained.

As shown in FIG. 4, the binding member 2 further includes several components in addition to the parts or components shown in FIG. 3. Specifically, the binding member 2 in FIG. 4 includes fixed pressing plates 21 and 22 at both ends in the first direction (the X direction, corresponding to a direction perpendicular to a drawing sheet of FIG. 3). It is to be noted that each of the X, Y, and Z directions are common among FIGS. 1 and 4. The fixed pressing plate 21 and the fixed pressing plate 22 are connected through guide members 4 and 5 located on both sides in a second direction (the Y direction). The components indicated by a reference numeral "2" in FIG. 3 are the guide members 4 and 5 exactly.

Between the guide member 4 and the guide member 5, a movable pressing plate 25 is also provided in addition to the pressing plates 21 and 22. The movable pressing plate 25 is located between the fixed pressing plate 21 and the fixed pressing plate 22 in the first direction. The plurality of batteries 100 are bound within the area between the fixed pressing plate 22 and the movable pressing plate 25. The fixed pressing plate 21 is provided with an adjusting screw 26. By operation of this adjusting screw 26, the position of the movable pressing plate 25 can be adjusted in the first direction. As the movable pressing plate 25 is moved toward the fixed pressing plate 22, the bound batteries 100 can be pressed in the first direction. However, the batteries 100 in a state shown in FIG. 4 are not yet under pressure.

Many partition plates 27 are provided between the movable pressing plate 25 and the fixed pressing plate 22. Those partition plates 27 are each located as sandwiched between the adjacent batteries 100 to be bound. Each of the partition plates 27 is held in the guide members 4 and 5 with brackets 28 arranged on both sides of each partition plate 27 in the second direction so that each partition plate 27 is slidable in the first direction. The partition plates 27 are members which directly transfer pressure in the first direction to each of the bound batteries 100. In FIG. 4, the batteries 100 are each sandwiched between the adjacent partition plates 27. The surfaces of each battery 100 to be applied with pressure from each partition plate 27 are the surfaces having a maximum area, that is, a front surface and a back surface when seen from the X direction in FIG. 1. Remaining surfaces of each battery 100, that is, an upper surface (on which the positive current collector terminal 31 and the negative current collector terminal 32 are attached), a bottom surface, and side surfaces, are not applied with pressure by the partition plates 27.

The binding member 2 configured as above has a feature in the shape of the guide members 4 and 5. In particular, the cross-sectional shape of the guide members 4 and 5 appearing in FIG. 3 is a distinctive feature in the present disclosure. This feature will be described below. As shown in FIG. 3, the guide members 4 and 5 each include a vertical wall part 6, a bottom plate part 29, and an upper large-width part 30. The vertical wall part 6 is provided, at its middle position in a vertical direction (i.e., the third direction), with a protruding part 35 protruding outward in a width direction (i.e., the second direction). The protruding part 35 is formed, on its protruding end face, with apertures 7. In addition, the vertical wall part 6 is also formed with apertures 36 at positions above and below the protruding part 35.

Herein, the distance S between the vertical wall part 6 of the guide member 4 and the vertical wall part 6 of the guide member 5 is wider than the width W of each battery 100. This makes a clearance between each side surface of each battery 100 and each inner surface of the vertical wall parts 6. In other words, the vertical wall parts 6 are located on both sides in the Y direction at a distance from both side surfaces of the batteries 100. The apertures 7 are positioned in the central area of each vertical wall part 6 with respect to its entire vertical dimension (in the Z direction). The upper large-width parts 30 are each located above the corresponding vertical wall parts 6. The distance between the upper large-width part 30 of the guide member 4 and the upper large-width part 30 of the guide member 5 is larger than the distance S between the vertical wall parts 6 of the guide members 4 and 5.

Figure 6:
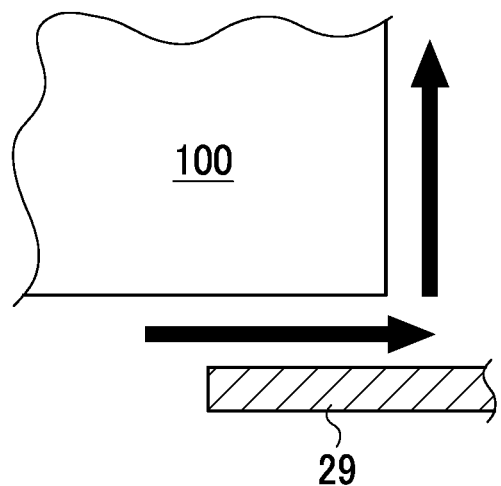
FIG. 6 is an enlarged view of part of FIG. 3.

The bottom plate parts 29 are each located below the corresponding vertical wall parts 6. In FIG. 3, each bottom plate part 29 is illustrated as if it is located just beneath the bottom surface of the battery 100; however, a clearance is actually left under the bottom surface of each battery 100 as shown in FIG. 6. This clearance under the bottom surface of each battery 100 can also be formed in such a way that the batteries 100 are bound and supported by the foregoing pressure applied in the first direction. Alternatively, for example, the batteries 100 may be supported by such a configuration as shown in FIGS. 7 to 9.

Figure 7:
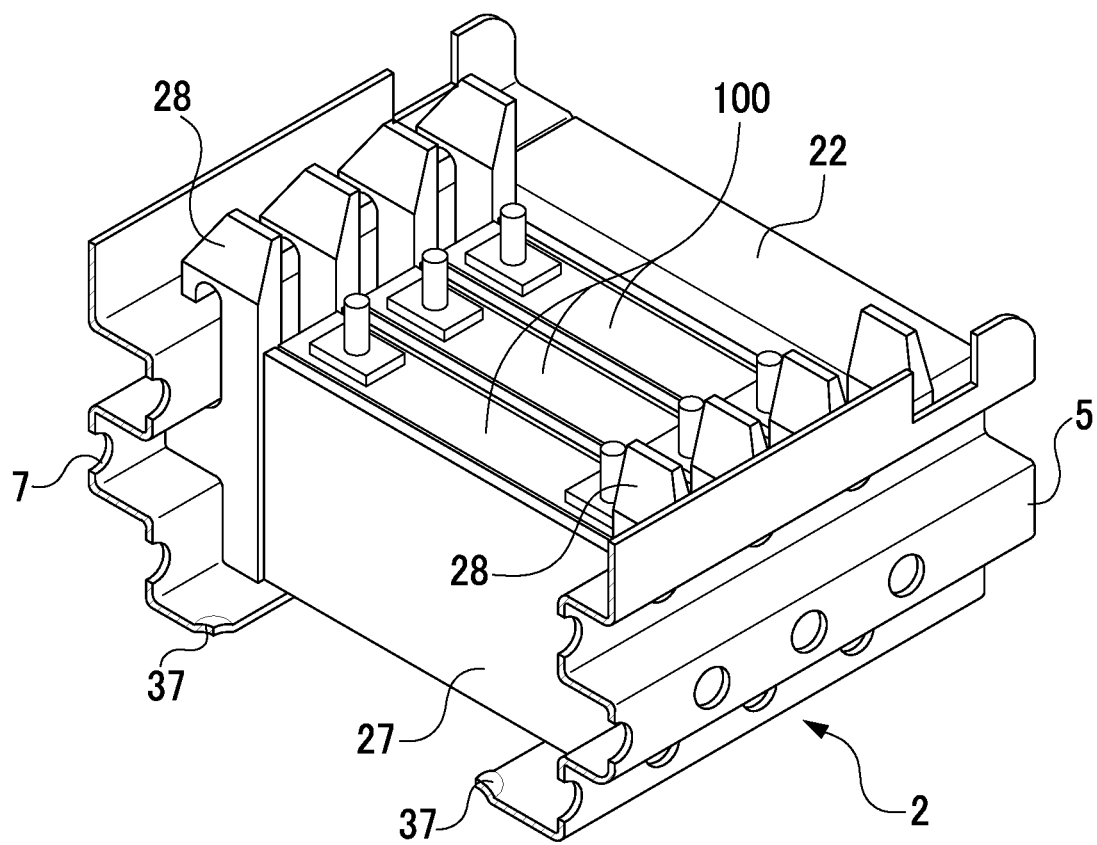
FIG. 7 is a partial perspective view (Part 1) showing the details of a bottom plate part.
Figure 8:
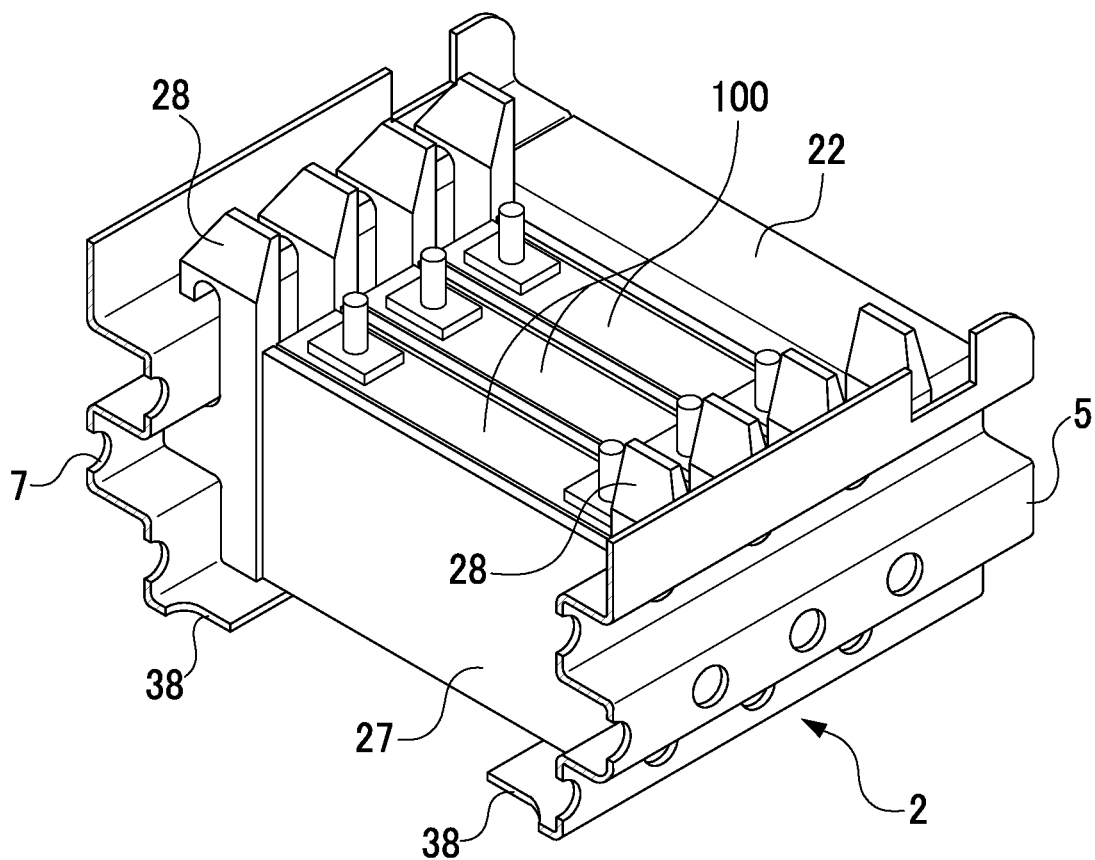
FIG. 8 is a partial perspective view (Part 2) showing the details of a bottom plate part.

FIG. 7 shows a configuration example that bumps 37 are locally formed on the bottom plate parts 29 of the guide members 4 and 5. When the batteries 100 are mounted with their bottom surfaces located on the bumps 37, a clearance is created under the bottom surface of each battery 100 excluding portions contacting with the bumps 37. Instead of the upward projecting bumps 37 provided in the bottom plate parts 29, the batteries 100 may be provided with downward projecting bumps on the bottom surfaces. FIG. 8 shows a configuration example that cutouts 38 in the second direction are locally provided in the bottom plate parts 29. The depth of each cutout 38 in the second direction is designed such that at least a deepest end of each cutout 38 is located outside the side surface of each battery 100. Accordingly, the cutout 38 is located just beneath a part of the bottom surface of the battery 100. Instead of the cutouts 38 provided in the bottom plate parts 29, the bottom surface of each battery 100 may be formed with a groove extending in the width direction (i.e., the second direction) at least in the area close to each end in the width direction. The bumps 37 and the cutouts 38 are actually provided at many locations. In these cases, the guide members 4 and 5 have to be made of insulating material, such as rubber, plastic, and ceramics.

Figure 9:
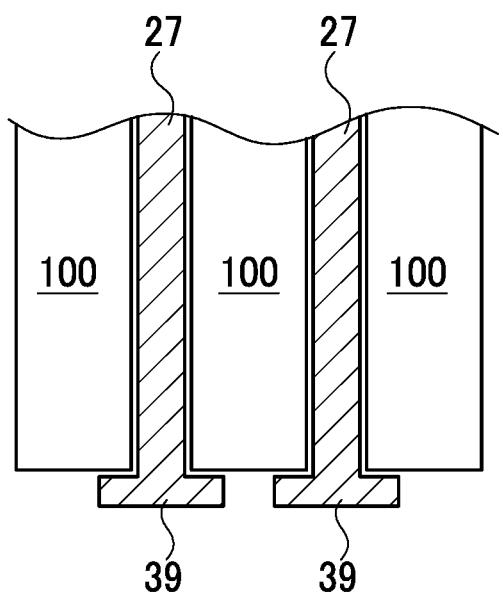
FIG. 9 is a cross-sectional view showing one example of a cross-sectional shape of a partition plate.

FIG. 9 shows a configuration example that each partition plate 27 is provided, at its lower end, with a thick base part 39 for supporting the bottom surfaces of the batteries 100. Each thick base part 39 does not need to extend all over the entire dimension of each partition plate 27 in the second direction and has only to be formed partly by at least a length capable of supporting the batteries 100. In this case, the guide members 4 and 5 may be made of either conductive material or insulating material.

Next, the blower mechanism 3 of the battery manufacturing apparatus 1 shown in FIG. 3 will be described. The blower mechanism 3 in FIG. 3 includes a blast fan 40, a duct 41, an upper chamber 8, and a lower chamber 9 and is configured such that an air stream generated by the blast fan 40 flows through the duct 41 and then is dividedly supplied to the upper chamber 8 and the lower chamber 9. The upper chamber 8 and the lower chamber 9 each have a certain length in the first direction (i.e., the X direction in FIG. 4). The upper chamber 8 and the lower chamber 9 may be provided extending across the range from the movable pressing plate 25 to the fixed pressing plate 22. The upper chamber 8 and the lower chamber 9 are one examples of a fluid supplying part of the present disclosure.

The upper chamber 8 is located above the bound batteries 100 and includes an opening 11 on a lower surface. Below this opening 11, flow guide plates 42 are provided at a slant to widen outward in the width direction toward the bound batteries 100. However, even lower ends of the flow guide plates 42, which are most widely opened, fall within the space defined between the upper large-width part 30 of the guide member 4 and the upper large-width part 30 of the guide member 5. The lower chamber 9 is located below the bound batteries 100 and includes an opening 12 on an upper surface. Above this opening 12, flow guide plates 43 are provided at a slant to widen outward in the width direction toward the bound batteries 100. The openings 11 and 12 of the upper chamber 8 and the lower chamber 9 serve to allow air streams to be ejected from both sides of each of the bound batteries 100 (i.e., the battery stack) in the third direction (the Z direction) toward the batteries 100. The opening 11 and the opening 12 are respectively one examples of a first discharging part and a second discharging part in the present disclosure.

Figure 2:
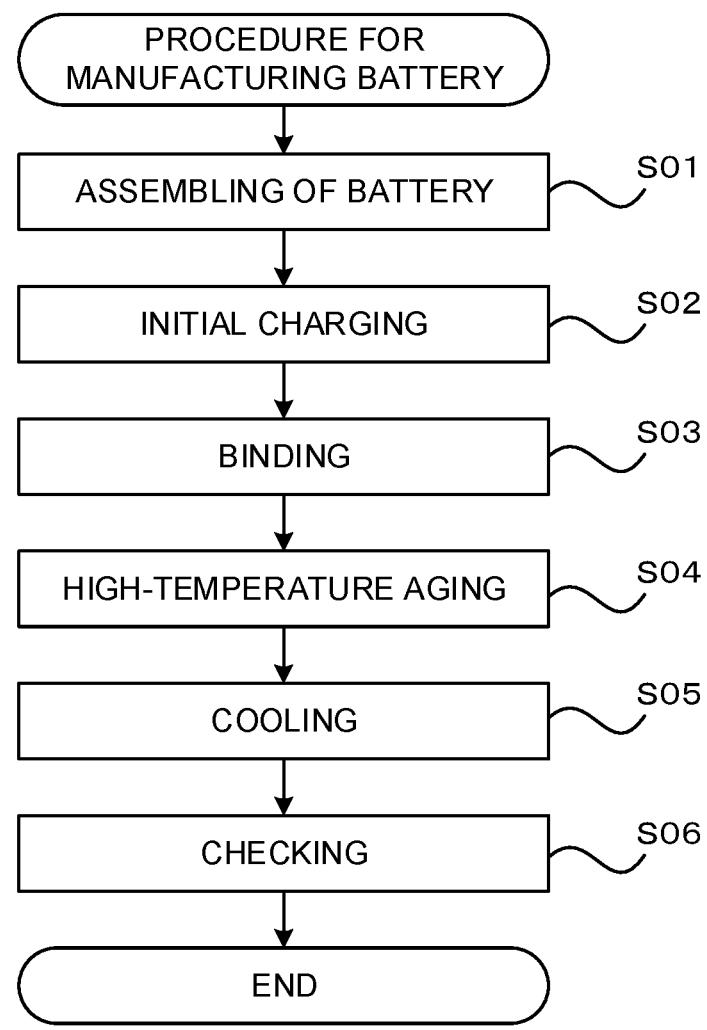
FIG. 2 is a flowchart showing a procedure for manufacturing the battery in the embodiment.

While the plurality of batteries 100 are mounted in the battery manufacturing apparatus 1 configured as above in the form of the battery stack, the batteries 100 are subjected to steps S04 (High-temperature aging) and S05 (Cooling) in the flowchart in FIG. 2. In the step S04 (High-temperature aging), the battery manufacturing apparatus 1 simply binds the plurality of batteries 100 (the battery stack) by the binding member 2. The blast fan 40 is in a non-operating state.

On the other hand, in the step S05 (Cooling), the blast fan 40 is activated, causing air streams for cooling to be discharged from the upper chamber 8 and the lower chamber 9 toward the batteries 100. The motion of the discharged air streams will be explained with reference to arrows in FIG. 3.

The opening 11 of the upper chamber 8 discharges an air stream (arrow A) downward from above. A part of the air stream A impinges on the upper surfaces of the batteries 100 and then flows outward in the second direction (arrows B). Finally, the air discharged as the air stream A from the opening 11 enters between the both side surfaces of each battery 100 and the vertical wall parts 6 of the guide members 4 and 5 and further moves downward (arrows C).

The opening 12 of the lower chamber 9 discharges an air stream (arrows D) upward from below. The air streams D impinge on the bottom surfaces of the batteries 100 and then flow outward in the second direction (arrows E). Finally, the air discharged as the air streams D from the opening 12 enter between the both side surfaces of each battery 100 and the vertical wall parts 6 of the guide members 4 and 5 and further move upward (arrows F).

The air streams C and the air streams F directly collide with each other in the space defined by the side surfaces of the batteries 100 and the vertical wall parts 6. Thereafter, the air streams C and F merge together and flow outward in the second direction through the apertures 7 of the protruding parts 35 (arrows G). It is to be noted that the apertures 36 of the vertical wall parts 6 at locations other than in the protruding parts 35 also allow a certain amount, but not much, of air to escape outward. The streams of air for cooling in the cooling step of the present embodiment travel along the above paths.

In the above air streams, the upper surface, bottom surface, and both side surfaces of each battery 100 release heat of the batteries 100 to surrounding air. In particular, since no obstacle that may resist the air streams on both side surfaces of each battery 100, whole the both side surfaces release heat. This configuration achieves a high efficiency of cooling each battery 100. Furthermore, at a location where the foregoing air streams C and air streams F collide with each other, turbulent flows are generated, thereby causing small air streams to impinge on the side surfaces of each battery 100. This also contributes to the high cooling efficiency. Moreover, since the position of the apertures 7 in the height direction is at the center of the vertical wall part 6 in the height direction, the location where the turbulent flows occur is also at the center of each side surface of each battery 100 in the height direction. Thus, this configuration also contributes to the high cooling efficiency. In the present embodiment, accordingly, a required time for the cooling step S05 in the flowchart of FIG. 2 needs not to be set so long. Consequently, the efficiency of manufacturing the batteries 100 can be increased by just that much.

In the present embodiment, the front and back surfaces of each battery 100, which have the largest area among outer surfaces of each battery 100, do not so much contribute to heat release. This is because those surfaces, in the battery stack state, are substantially entirely covered by the partition plates 27 and therefore are not exposed to the air streams. However, this is inevitable because pressing those surfaces of the batteries 100 bound by the binding member 2 is prioritized over heat release. It is alternatively possible to design the partition plates 27 to include grooves, as indicated by a reference number "76" in FIG. 4 of JP 2013-118048A. This configuration can also make the front and back surfaces of each battery 100 contribute to heat release at some level. In this case, more preferably, the partition plates 27 may be designed in such a shape as to allow air streams entering the groove to flow outward in the second direction.

According to the present embodiment described in detail above, the cooling step after the high-temperature aging step in the process of manufacturing the batteries 100 is performed on the battery stack including the plurality of batteries 100 bound by the binding member 2 of the battery manufacturing apparatus 1 shown in FIG. 3. In the binding member 2 in the present embodiment, the apertures 7 and the vertical wall parts 6 are provided in the guide members 4 and 5. This configuration allows the air discharged from the chambers 8 and 9 located above and below the batteries 100 to smoothly flow in the space on the side surfaces of the batteries 100 and generate turbulent flows in that space, and finally flow outward in the second direction, so that the cooling step can be performed with the high cooling efficiency. Thus, the battery manufacturing apparatus 1 and the battery manufacturing method can be realized capable of performing high-efficient cooling of the plurality of batteries 100 in a bound state.

The foregoing embodiments are mere examples and give no limitation to the present disclosure. The present disclosure may be embodied in other specific forms without departing from the essential characteristics thereof. Especially, the guide members 4 and 5 may be designed in various shapes. For example, the upper large-width parts 30 are not indispensable. The bottom plate parts 29 also may be omitted if the partition plates 27 are provided with the base parts 39 shown in FIG. 9. Of the apertures 7 and 36, the apertures 36 do not have to be formed. The apertures 7 also may be a long slit extending in a longitudinal direction (i.e., the first direction), instead of the discrete apertures shown in FIG. 4. The vertical wall parts 6 do not have to include outward protrusions such as the protruding parts 35. An exhaust pipe may be connected to the outside of each aperture 7. In this case, a suction pump may be provided at an opposite end of the exhaust pipe from the aperture 7.

Figure 10:
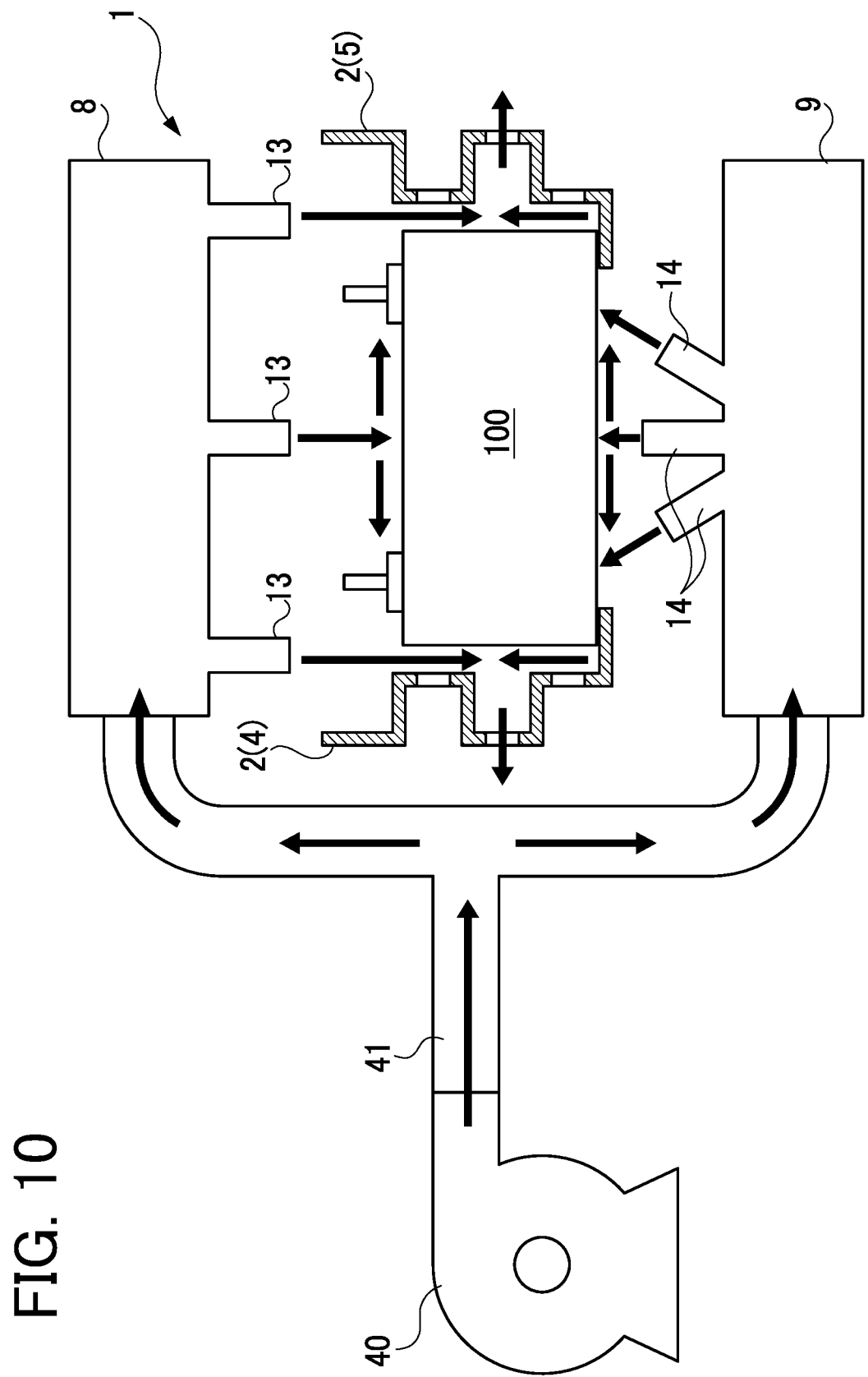
FIG. 10 is a cross-sectional diagram showing a modified example in which a chamber has a different shape from that in the embodiment.

Furthermore, the opening shapes of the chambers 8 and 9 also may be modified. Instead of the flow guide plates 42 and 43, nozzles 13 and 14 may be provided as shown in FIG. 10. Specifically, a large number of these nozzles 13 and 14 may be arranged in the first direction (i.e., the X direction). However, the number of the nozzles is not necessarily the same as the number of the batteries 100 bound by the binding member 2. The battery type of the batteries 100 to be manufactured is not particularly limited and may be selected from a lithium ion battery, a nickel hydride battery, and others. Further, the cooling step may be applied at any stages in the process of manufacturing the batteries 100, not limited to just after the high-temperature aging step. Even in a manufacturing process including no high-temperature aging step, if there is a situation where the temperature of the batteries 100 rises, the cooling step may be applied at a subsequent stage after the temperature rise of the batteries 100. The cooling fluid is not limited to air, but may be water and any other kinds of liquid.

REFERENCE SIGNS LIST

1 Battery manufacturing apparatus
2 Binding member
3 Blower mechanism
4 Guide member
5 Guide member
6 Longitudinal wall part (Second both-side part)
7 Aperture
8 Upper chamber (Fluid supplying part)
9 Lower chamber (Fluid supplying part)
10 Battery case
11 Opening
12 Opening
20 Sealing lid
21 Fixed pressing plate
22 Fixed pressing plate (First both-side part)
25 Movable pressing plate (First both-side part)
26 Adjustment screw
27 Partition plate
40 Blast fan
50 Outer package body
100 Battery

What is claimed is:

1. A battery manufacturing apparatus comprising:
a binding member configured to bind a battery stack including a plurality of flat batteries arranged in one direction; and
a fluid supplying part configured to blow cooling fluid on the battery stack bound by the binding member,
the binding member comprising:
first both-side parts configured to bind the battery stack by applying a load on the battery stack from both sides of the batteries in a first direction in which the batteries are arranged; and
second both-side parts to be placed at both sides of the batteries included in the battery stack in a second direction different from the first direction to face, at a distance from, both side surfaces of the batteries in the second direction,
the fluid supplying part including a first discharging part and a second discharging part each configured to discharge the cooling fluid from both sides of the battery stack in a third direction different from both the first and the second directions toward the battery stack bound by the binding member, and
each of the second both-side parts include an aperture located in a central area in the third direction, the aperture configured to allow the cooling fluid supplied from the fluid supplying part to flow outward in the second direction,
wherein each of the second both-side parts are configured to allow both the cooling fluid discharged from the first discharging part and the cooling fluid discharged from the second discharging part to flow into the space between the batteries included in the battery stack and the second both-side parts.

2. The battery manufacturing apparatus according to claim 1,
wherein each of the second both-side parts is provided, at its middle position in the third direction, with a protruding part protruding outward in the second direction, and the apertures of the second both-side parts are located on protruding end faces of the protruding part.

3. The battery manufacturing apparatus according to claim 1,
wherein the fluid supplying part is provided with first flow guide plates at the first discharging part at a slant to widen outward in the second direction toward the battery stack bound by the binding member, and
second flow guide plates at the second discharging part at a slant to widen outward in the second direction toward the battery stack bound by the binding member.

4. The battery manufacturing apparatus according to claim 3,
wherein each of the second both-side parts comprises:
a wall part located at a distance from a side surface of the battery stack bound by the binding member in the second direction; and
a large-width part,
wherein the distance between the large-width parts is larger than the distance between the wall parts, and
the most widely opened ends of the first flow guide plates fall within the space defined between the large-width parts.

\* \* \* \* \*